United States Patent Office 3,041,003
Patented June 26, 1962

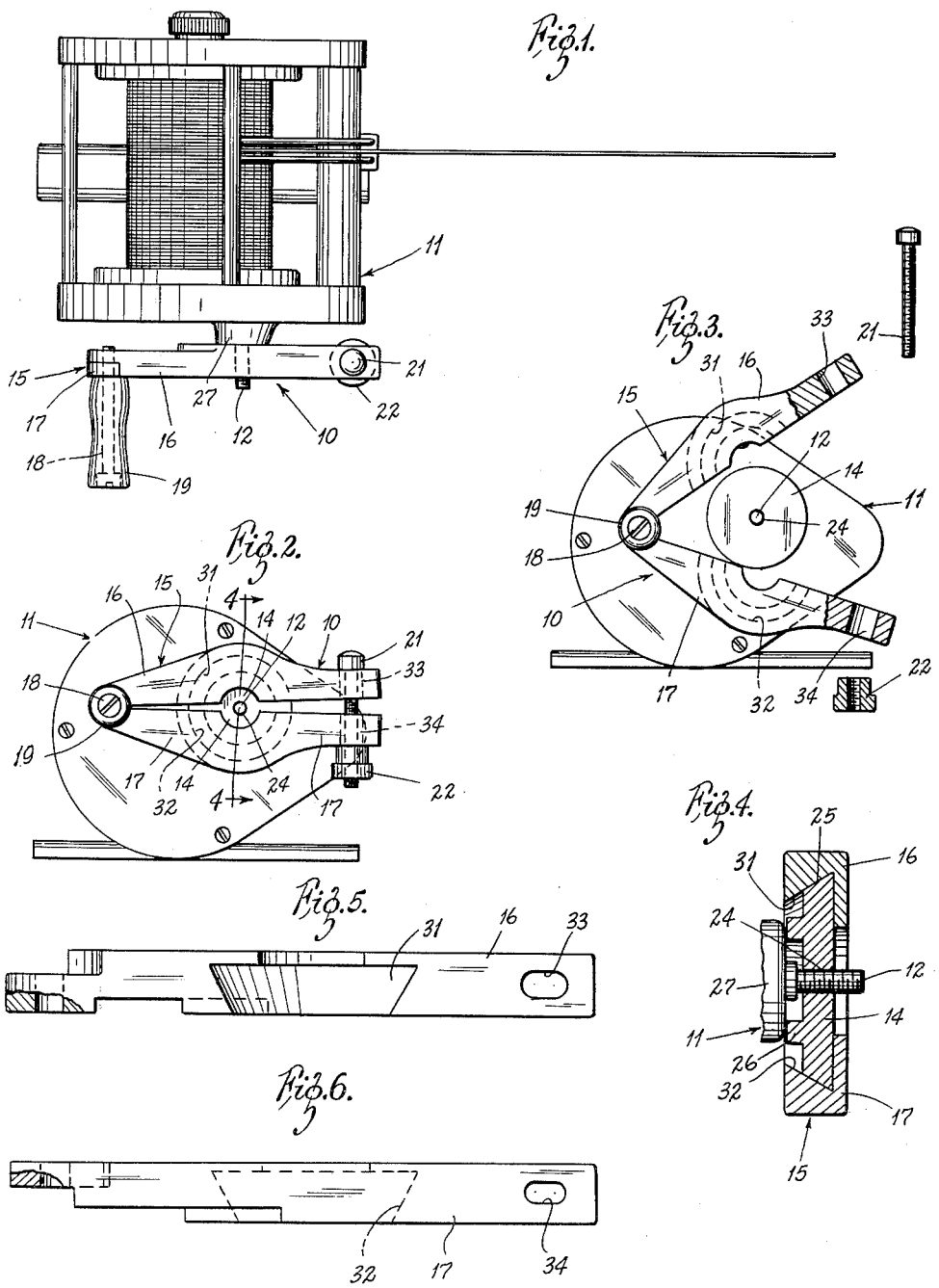

3,041,003
DRAG FOR FISHING REEL
Wilfred A. Kettler, 5752 DeGiverville Ave.,
St. Louis 12, Mo.
Filed June 12, 1959, Ser. No. 820,027
2 Claims. (Cl. 242—84.5)

This invention relates to improvements in drags for fishing reels and, in particular, it is concerned with a friction drag that may be placed on a conventional handle shaft of a fishing reel.

Drag devices for fishing reels are well known in the art and have generally required fairly complicated structure. Such drag devices are for the well known purpose of regulating the tension that may be placed through the handle upon the fishing line.

By means of this invention there has been provided a drag device which may be used on any conventional fishing reel, such as the usual fresh water reel which is not equipped with a handle drag. The customary handle of the fishing reel can be very simply removed and replaced with the handle and drag device provided by this invention.

Essentially, the invention comprises a drag drum which is placed upon the reel handle shaft in place of the conventional handle. A yoke member similar to a handle crank and comprised of a pair of yoke elements fits over the drum and may be tightened thereagainst to a desired tension. A conventional handle piece is positioned at one end of the yoke member and by appropriate tightening of the yoke member against the drum, the desired drag pressure may be very simply obtained.

Through the use of this invention, there has been provided a drag device which can be very simply installed in the place of the usual fishing reel handle. The installation may be made by the average fisherman without any special skill. Also, the drag device, once installed, can be very simply adjusted to varying drag pressures depending upon the desire of the fisherman.

Accordingly, it is a primary object of this invention to provide a fishing reel drag which can be placed upon a conventional fishing reel in the place of the usual handle in a very simple installation.

Another object of this invention is to provide a drag device for a fishing reel comprised of a frusto-conical drag drum and a yoke member made of a pair of pivoted arms fitting over the drag drum, and which can be tightened thereagainst in varying degrees of frictional adjustment and in which a handle is provided on the yoke for the operation of the fishing reel.

Still another object of this invention is to provide an easily installed drag device which can be made of simple materials of construction in a rugged and economical manner that can be employed by an average fisherman.

Further objects of this invention will appear in the detailed description which follows and will be further apparent to those skilled in the art.

For the purpose of illustration of this invention there is shown in the accompanying drawing a preferred embodiment thereof. It is to be understood that these drawings are for the purpose of illustration only and that the invention is not limited thereto.

In the drawings:

FIGURE 1 is a top plan view of a conventional fishing reel having the usual handle removed and replaced with the drag device of this invention;

FIGURE 2 is a view in side elevation of the reel and drag device of this invention;

FIGURE 3 is a view similar to FIGURE 2, but showing the drag device partially disassembled;

FIGURE 4 is a view in section taken on the line 4—4 of FIGURE 2 showing the construction of the drag drum and the mating cooperation of the yoke elements;

FIGURE 5 is a bottom plan view of the upper yoke element; and

FIGURE 6 is a bottom plan view of the lower yoke element.

In FIGURE 1 the drag device of this invention is generally indicated by the reference numeral 10 and is shown attached to a conventional fishing reel 11 having a handle shaft 12. It is to be understood that the reel is one in which a normal handle has been removed from the handle shaft by removing an end nut (not shown) which has been replaced by the drag device of this invention.

The major components of the drag device are best shown by referring to FIGURE 3. These components include a drag drum 14 and a yoke member 15, which is adapted to be positioned in varying degrees of pressure or frictional relationship upon the drum. The yoke member 15, which also functions as a crank, is comprised of an upper element 16 and a lower element 17 pivotable with respect to one another by a pivot pin 18, which also serves as a shaft for a handle 19. At the other end are received a tightening bolt 21 and an adjustment nut 22.

The drag drum 14 is best shown in the cross sectional view of FIGURE 4. As shown in this FIGURE, it is provided with a central opening 24, which is slightly smaller than the external diameter of the handle shaft 12 so that it may be frictionally forced upon it. The drum is in the shape of a frusto-conical disc and has tapering sides 25 in order that the yoke may be fitted thereover in keyed relationship so that it will maintain its position on the drum. A circular flange 26 is also provided so that it may serve as a stop or wear member when positioned against the mounting 27 for the handle shaft 12.

The yoke member is shown in its particular details of construction in FIGURES 2 through 6. As previously described, it comprises the upper and lower members 16 and 17, which are pivoted at one end through the use of a pivot pin 18. Both members are provided with oppositely disposed recesses in the form of a semi-frusto-conical configuration so that the upper and lower yoke elements may be closed upon the drum member. Thus, as best shown in FIGURE 5, the upper member 16 is provided with a recess 31 while the lower element 17 is provided with a recess 32. At the ends opposite from the pivot pin 18, openings 33 and 34 are provided for the insertion of the tightening bolt 21 and a nut 22. The bolt and nut are inserted therein in obvious fashion and can be tightened for desired pressure adjustment.

Use

The drag device of this invention is very simply adapted to be placed upon a conventional fishing reel such as that shown at 11 in FIGURES 1, 2 and 3. The conventional handle is first removed by loosening the usual end nut from the shaft 12. Once the conventional handle is removed, the drag device of this invention in the position shown in FIGURE 3 is installed by pressing the drag drum 14 upon the handle shaft 12. This provides a tight frictional relationship and, if desired, the drum may be permanently affixed to the shaft 12 by any conventional means.

Once the drum is positioned upon the shaft 12, the yoke member is spread apart as in the position shown in FIGURE 3 and then fitted upon the drum so that the top portion of the drum 14 nests in the recess 31 provided in the top element of the yoke member and the bottom portion of the drum fits in the recess 32 in the bottom element. Once this relationship has been established, the adjustment bolt 21 is inserted through the openings 33 and 34 in the yoke elements, and the adjustment nut 22 is tightened to a desired position. Obviously, the tighter the nut 23 is adjusted, the heavier will be the drag pressure that can be exerted upon the fishing reel by the operation of the handle 18. Thus, through the adjustment of the nut 22, a full and wide range of drag pressure may be established for varying fishing conditions, such as trolling or for playing various types of fish in different types of water.

As a special feature of this invention, it will be noted that the particular construction of the drum and yoke member is such that no stop member is needed to position the two together. Thus, once the yoke member is closed against the drum the frusto-conical relationship prevents the yoke member from being moved axially with respect to the drum, either toward the fishing reel or away from it. This relationship further enhances the speedy installation and adjustment of the device.

It has been found that the drum and yoke members can very advantageously be made of organic plastic material which is self-lubricating and resists corrosion. Thus, this particular construction lends itself extremely well to the construction of the drag mechanism, but it is to be understood that the invention is not limited to any particular materials.

It should also be apparent that the drag mechanism can be very simply installed by the average fisherman and adjusted to any desired operating condition. The mechanism is extremely simple and can be installed on any conventional fishing reel, and can be removed when desired to be replaced with a conventional handle with which the usual fishing reel is supplied. Thus, full adaptability and flexibility is provided.

Various changes and modifications may be made within this invention as will be readily apparent to those skilled in the art. Such changes and modifications are within the scope and teachings of this invention as defined by the claims appended hereto.

What is claimed is:

1. A fishing reel drag device comprising a drag drum mounted on the reel handle shaft, said drum having a frusto-conical configuration being coaxially disposed relative to said handle shaft, and an adjustable yoke member mounted on said drum, said yoke being comprised of two elements having an interiorly tapering surface merging with an opposing flange defining opposed drag drum recesses to provide a frusto-conical space when fitted together for the nesting of said drum therebetween, said elements being pivoted together at one end and having means for drawing the opposite ends together whereby the yoke member and the drum are drawn together in frictional relation by both a radial and axial force, said axial force being directed against said flange, and a handle element at the pivoted end of said yoke member.

2. A fishing reel drag device comprising a drag drum mounted on the reel handle shaft, said drum having a frusto-conical configuration being coaxially disposed relative to said handle shaft, and an adjustable yoke member mounted on said drum, said yoke being comprised of two elements having an interiorly tapering surface merging with an opposing flange defining opposed drag drum recesses to provide a frusto-conical space when fitted together for the nesting of said drum therebetween, said elements being pivoted together at one end and having means for drawing the opposite ends together whereby the yoke member and the drum are drawn together in frictional relation by both a radial and axial force, said axial force being directed against said flange, said means comprising an elongated element fitting through both of said ends with a fixed stop element at one end of the elongated element and an adjustable stop element at the other end.

References Cited in the file of this patent

UNITED STATES PATENTS

| | | |
|---|---|---|
| 786,656 | MacMahon | Apr. 4, 1905 |
| 818,880 | Ernst et al. | Apr. 24, 1906 |
| 847,890 | Blackburn | Mar. 19, 1907 |
| 2,096,299 | Grieten | Oct. 19, 1937 |
| 2,492,819 | Schulz | Dec. 27, 1949 |